US010113772B2

(12) United States Patent
Lieskoski

(10) Patent No.: US 10,113,772 B2
(45) Date of Patent: Oct. 30, 2018

(54) GROUND CIRCUIT IN A LOW-ENERGY SYSTEM

(71) Applicant: Mauri Antero Lieskoski, Vaasa (FI)

(72) Inventor: Mauri Antero Lieskoski, Vaasa (FI)

( * ) Notice: Subject to any disclaimer, the term of this patent is extended or adjusted under 35 U.S.C. 154(b) by 59 days.

(21) Appl. No.: 15/187,171

(22) Filed: Jun. 20, 2016

(65) Prior Publication Data

US 2016/0290681 A1    Oct. 6, 2016

Related U.S. Application Data

(62) Division of application No. 13/513,597, filed as application No. PCT/FI2010/050736 on Sep. 23, 2010.

(30) Foreign Application Priority Data

Dec. 4, 2009    (FI) ..................................... 20096291

(51) Int. Cl.
*F24J 3/08*    (2006.01)
*F24T 10/13*    (2018.01)
(Continued)

(52) U.S. Cl.
CPC .............. *F24T 10/13* (2018.05); *F24T 10/10* (2018.05); *F24T 10/15* (2018.05); *F28D 1/0472* (2013.01);
(Continued)

(58) Field of Classification Search
CPC ...... F28D 1/022; F28D 1/0472; F28D 1/0473; F28D 7/024; F24J 3/08; F24J 3/086; F24J 3/081–3/083; F28F 9/0132; Y02E 10/12
(Continued)

(56) References Cited

U.S. PATENT DOCUMENTS

| 1,091,369 A | 3/1914 | Mejani |
| 2,650,800 A | 9/1953 | Halsey |

(Continued)

FOREIGN PATENT DOCUMENTS

| DE | 3009532 A1 | 9/1980 |
| DE | 3739689 A1 | 6/1989 |

(Continued)

OTHER PUBLICATIONS

Int'l Search Report dated Mar. 4, 2011 in Int'l Application No. PCT/FI2010/050736; Written Opinion.

(Continued)

*Primary Examiner* — Orlando E Aviles Bosques
*Assistant Examiner* — Joel Attey
(74) *Attorney, Agent, or Firm* — Panitch Schwarze Belisario & Nadel LLP

(57) ABSTRACT

A ground circuit in a low-energy system includes a connection pipeline (3), collection pipe system (2) and a return pipeline(4) for circulating a transfer fluid. The ground circuit is utilized for transferring thermal energy recovered from its surroundings, for instance, to a heat pump (5). The ground circuit collection pipe system (2) consists of a hollow profile (6) arranged to be a coil, whereby the hollow profile is connected at its first end to a connection pipeline (3) for conveying the transfer fluid along the hollow profile from the first coil end to the second, and at the second end of the coil, the second end of the hollow profile is connected to the return pipeline (4) for conveying the transfer fluid from the hollow profile towards the place where it is used. At the opposite ends of the hollow profile, means for controlling the fluid flow are arranged.

5 Claims, 6 Drawing Sheets

(51) Int. Cl.
  *F28D 7/02* (2006.01)
  *F28F 9/013* (2006.01)
  *F24T 10/10* (2018.01)
  *F24T 10/15* (2018.01)
  *F28D 1/047* (2006.01)
  *F28D 1/02* (2006.01)

(52) U.S. Cl.
  CPC ............ *F28D 7/024* (2013.01); *F28F 9/0132* (2013.01); *F28D 1/022* (2013.01); *F28D 1/0473* (2013.01); *F28F 2240/00* (2013.01); *Y02E 10/12* (2013.01); *Y02E 10/125* (2013.01)

(58) Field of Classification Search
  USPC ..... 165/45, 132, 157, 155, 156, 163; 62/260
  See application file for complete search history.

(56) References Cited

U.S. PATENT DOCUMENTS

| | | | |
|---|---|---|---|
| 4,289,197 A | 9/1981 | McNamara | |
| 4,372,372 A | 2/1983 | Hunter | |
| 4,464,909 A | 8/1984 | Litzberg | |
| 4,516,629 A | 5/1985 | Bingham | |
| 4,570,452 A | 2/1986 | Bingham | |
| 4,825,664 A * | 5/1989 | Vandervaart | F25B 13/00 62/160 |
| 5,329,992 A | 7/1994 | Tripp | |
| 5,746,270 A | 5/1998 | Schroeder et al. | |
| 6,604,376 B1 | 8/2003 | Demarco et al. | |
| 6,736,191 B1 | 5/2004 | Lindberg et al. | |
| 2005/0103484 A1 | 5/2005 | Komatsu et al. | |

FOREIGN PATENT DOCUMENTS

| | | |
|---|---|---|
| DE | 3913429 A1 | 11/1989 |
| DE | 202006019801 U1 | 4/2007 |
| DE | 102008013013 A1 | 11/2008 |
| DE | 102007061177 A1 | 6/2009 |
| EP | 0023317 A1 | 2/1981 |
| EP | 1783441 A2 | 5/2007 |
| GB | 251024 A | 4/1926 |
| JP | S62-102086 A | 5/1987 |
| JP | H07-127924 A | 5/1995 |
| JP | H08-54192 A | 2/1996 |
| JP | H09-137972 A | 5/1997 |
| JP | 11-083240 | 3/1999 |
| JP | 2003-307368 A | 10/2003 |
| JP | 2005-021426 A | 1/2005 |
| JP | 2007-315742 A | 12/2007 |
| JP | 2009-103367 A | 5/2009 |
| WO | 8301102 A1 | 3/1983 |
| WO | 2006105605 A1 | 10/2006 |
| WO | 2008113604 A1 | 9/2008 |
| WO | 2011067457 A1 | 6/2011 |

OTHER PUBLICATIONS

Office Action and Search Report dated Jul. 6, 2010 in FI Application No. 20096291.

Office Action dated Jan. 20, 2011 in FI Application No. 20096291.

Office Action dated Aug. 12, 2014 in JP Application No. 2012-541544.

Extended European Search Report dated Feb. 4, 2015 in EP Application No. 10834270.0.

Office Action dated Jan. 20, 2016 in U.S. Appl. No. 13/513,597 by, Lieskoski.

Office Action dated Feb. 2, 2015 in U.S. Appl. No. 13/513,597 by, Lieskoski.

Office Action dated Jun. 29, 2015 in U.S. Appl. No. 13/513,597 by, Lieskoski.

* cited by examiner

GROUND CIRCUIT IN A LOW-ENERGY SYSTEM

CROSS-REFERENCE TO RELATED APPLICATION

This application is a Divisional of U.S. patent application Ser. No. 13/513,597, filed Aug. 20, 2012, which is a Section 371 of International Application No. PCT/FI2010/050736, filed Sep. 23, 2010, which was published in the English language on Jun. 9, 2011, under International Publication No. WO 2011/067457 A1, and the disclosures of which are incorporated herein by reference.

BACKGROUND OF THE INVENTION

The invention relates to a ground circuit in a low-energy system. The invention also relates to a method for recovering energy.

A ground circuit and a method of this kind are utilized, in particular, in systems where energy—as well heat as cold—is transferred with a terminal device from ground, rock or water by the intermediary of a transfer fluid. Said terminal device may be as well a heat pump as an air conditioning radiator.

In this context the low-energy system refers to a system whose energy source has a low temperature, and most conventionally this temperature may be in the range of +2 to +10° C. In this specification, the energy content generated by an energy source, such as ground, rock or water, will be referred to as low energy. Utilization of the low energy of ground, rock or water has generally referred to heating of a building or tap water by employing a heat pump or various heat collection circuits, for instance. There is conventionally obtained 2 to 4 units of heat per each electric energy unit used. In cold climate conditions the heating energy consumption for buildings is considerable, whereby the utilization of low-energy systems is becoming more and more economically viable as the costs of electricity and oil increase.

Naturally, the present collection circuit and collection method may also be utilized in cooling indoor spaces. In that case a cool transfer fluid coming from a heat collection circuit is circulated, for instance, through cooling beams, cooling radiators or the like devices.

Up to the present, a commonly used manner to recover energy has been to place a collection circuit, i.e. so-called ground circuit, in a soil layer surrounding a building, where it is buried in a frost-free depth substantially horizontally. A ground circuit of this kind requires a large surface area to obtain a sufficient efficiency, and consequently it can only be used on large plots of land. Pipe loops in a ground circuit shall be at least 1.5 m apart from one another so that the adjacent loops would not interfere with the energy recovery of one another. To place a horizontal pipe system in the ground requires that an extensive pipe trench system be dug throughout the length of the ground circuit, whereby the placement thereof in a finished courtyard area or park, for instance, is difficult without causing serious damage to the root systems of plants and trees.

A second manner to recover energy is to place a collection circuit in the bottom of a lake or another water body, whereby energy is transferred from the bottom sediment and water to a transfer fluid. The collection circuit may be conveyed into water on land, but in that case an outgoing pipeline and a return pipeline should have separate, specific trenches. The collection pipe system placed in water is easy to install in the bottom of the water body. However, a liquid-filled pipe is lighter than the surrounding water, and consequently it tends to rise towards the surface. Irregularly risen portions of the collection pipe system may produce in the collection pipe system air pockets that hamper the circulation of the transfer fluid. In order to provide steady energy yield the collection pipe system should be anchored to the bottom of the water body. The pipe system installed in the bottom of the water body is also more vulnerable to breakage than the one dug in the ground. For instance, an anchor of a boat or a similar device may get caught in the pipe system and break it. In the shore line the outgoing and incoming pipelines shall be buried sufficiently deep, so that the ice would not damage the pipe system in winter.

A third manner to recover energy, which is currently becoming more and more common, is to construct a so-called heat well. In that solution a special pipe system, which constitutes a ground circuit, is buried in a deep, vertical hole drilled preferably in rock. The heat well requires a very small surface area compared with a horizontal pipe system, and the amount of energy obtained therefrom is conventionally double compared with a collection circuit placed in a soil layer or in a water body. Energy yield is particularly good when the heat well is drilled in rock. It is common, however, that on top of the rock there is a significant layer of loose material, such as soil and/or rubble. This portion containing loose material increases the cost of a heat well, because it must be furnished with a special protective pipe which prevents the well from collapsing. In addition, energy yield from the loose material portion is poorer than from the rock portion, and consequently the well is to be made deeper, or there is to be made a plurality of wells side by side in the loose material.

Selection between these three collection methods depends on the location, surface area and soil of the available area. Because the construction of a collection circuit is labour intensive, the costs incurred have often been high, which for its part has curbed the interest in low-energy systems.

BRIEF DESCRIPTION OF THE INVENTION

The object of the present invention is to provide a ground circuit in a low-energy system, whereby the above-described problems could mainly be avoided.

This is achieved by a ground circuit in a low-energy system having the characteristics defined in the claims of the present invention. The problems of a ground circuit in the present low-energy system may be solved by combining the characteristics in the manner as stated in the claims. Further, the method for recovering energy in a ground circuit in a low-energy system in accordance with the invention is characterized by the claims.

The preferred embodiments of the invention are disclosed in the respective dependent claims.

The invention is based on the idea that the physical length a ground circuit takes in the environment may be substantially reduced by utilizing a coiled pipe in the structure of the ground circuit. A hollow profile encircling an internal cavity formed by a pipe of this kind may provide up to a 50-meter long collection pipe system for one meter of pipe in longitudinal direction. By arranging these coils nested one inside the other it is possible to further increase the total length of the collection pipe system. Each coil being tubular in structure, there is provided a ground circuit solution that is easy to manufacture and reliable in operation.

Considerable advantages are achieved by the invention. So, the same kind of collection pipe system may be used individually or in groups, in a water body or buried in the ground, either in vertical drillings or horizontal diggings.

Of the large amount of hollow profile arranged for the length of pipelines constituting the collection pipe system a considerably shorter pipe than before will suffice for implementing a collection circuit, whereby both installation and maintenance work becomes significantly easier.

By arranging several coiled collection pipe systems nested one inside the other it is possible to provide a multi-pipe collection circuit that is particularly well suited for flowing water and that is able to utilize effectively the energy content of water conveyed therein and flowing therethrough.

In particular, a multi-pipe collection pipe system consisting of nested coils is well suited for utilization, for instance, in the vicinity of flowing water such that the collection pipe system is connected at its opposite ends to vertical wells, into which a flow of the nearby water body is conveyed. Maintenance of the collection pipe system that is located on dry land and has a closed outer surface becomes simpler, when it is possible to use vertical wells for servicing the exchanger, for instance, for washing with pressure washers. In addition, the vertical wells enable flow rate control in the collection pipe system.

By placing the collection pipe system of the invention such that a flow space formed therein is substantially vertical, it is possible to provide in the flow space a flow-through even in low-flow water. As the collection pipe system extracts energy from the surrounding water, this water mass cools down, which in turn results in natural water circulation as the cooled water starts moving towards the surface of the water body.

In the manufacture of the pipe system it is even possible to utilize double-walled pipelines known per se, whose hollow profile is connected to connection and return pipelines.

Other advantages provided by the invention are described below, as particular embodiments of the invention are described in greater detail.

BRIEF DESCRIPTION OF THE DRAWINGS

In the following, some preferred embodiments of the invention are described in greater detail, with reference to the attached drawing, in which.

DETAILED DESCRIPTION OF THE PREFERRED EMBODIMENTS

Figure 1:
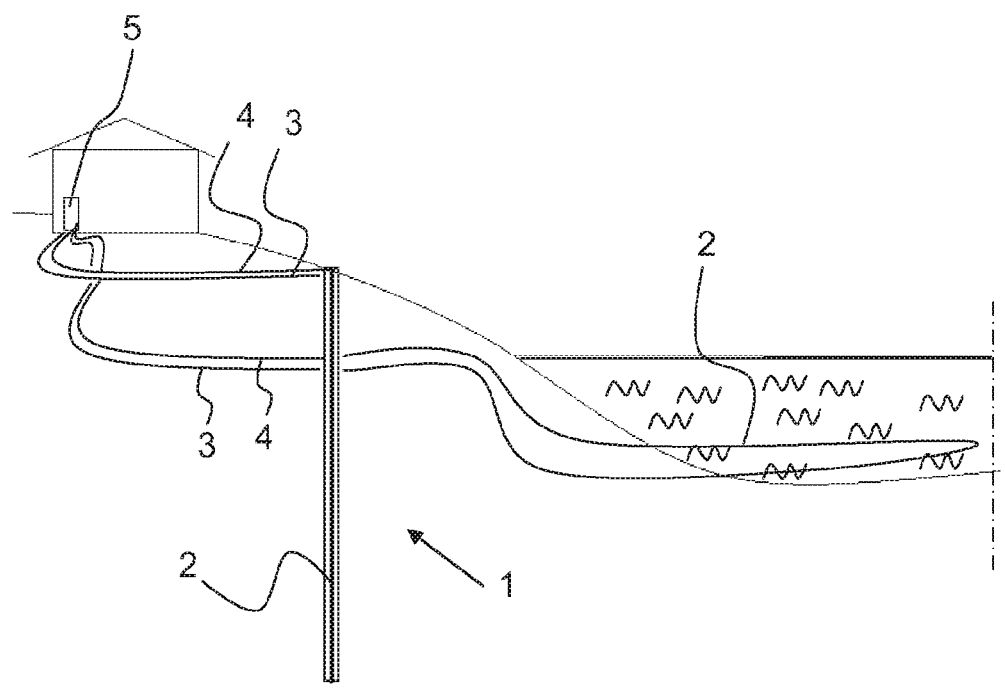
FIG. 1 shows known solutions for recovering energy.

In the present figures, embodiments of ground circuits in a low-energy system have not been shown on scale, but the figures are schematic illustrating the structure and operation of the preferred embodiments in principle. Thus, the structural parts indicated by reference numerals in the attached figures, correspond to the structural parts denoted by reference numerals in this specification.

It is known per se to collect energy, for instance, for use in a heat pump by utilizing the solutions in accordance with FIG. 1. The figure shows two parallel systems, the first of which comprises a collection pipe system 2 arranged in a heat well 1, which communicates with a heat pump 5 through connection and return pipelines 3 and 4. In the second system of the figure the heat pump communicates with a collection pipe system submerged in a nearby water body through second connection and return pipelines.

Even a schematic figure of this kind shows the large dimensions of the collection pipe systems 2 of these known solutions, which constitutes one essential challenge in the construction of low-energy systems.

Figure 2:
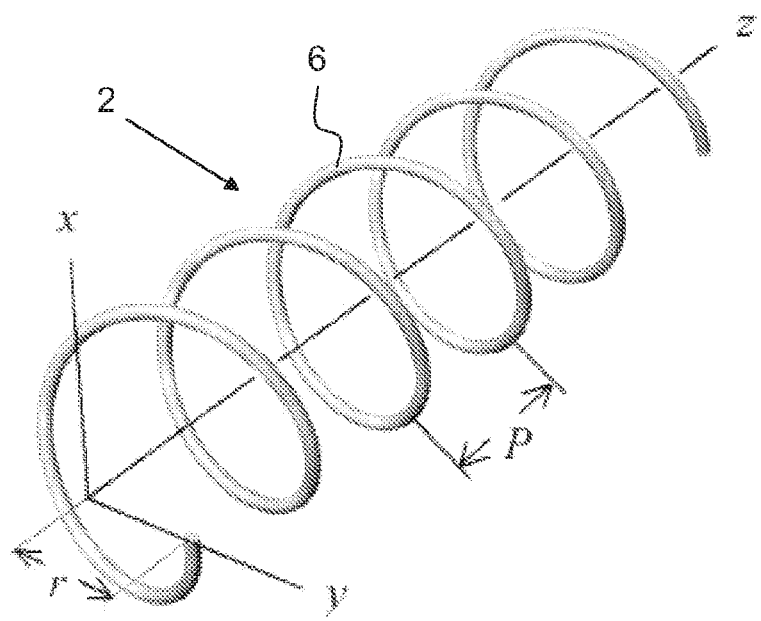
FIG. 2 is a schematic view of a coil constituting a collection pipe system.

It has been found that this kind of collection pipe system 2 of large physical dimensions is replaceable by a considerably more compact solution, in which a hollow profile 6 forming the collection pipe system is arranged, unlike before, to form a compact coil to be buried in the environment. A schematic embodiment of this coil is shown in FIG. 2. On the basis of the figure it is possible to find that the physical dimensions of the collection pipe system are affected by a radius r of the coil as well as the mutual distance between the adjacent coil rounds, i.e. the pitch P. The coil may even be formed such that it contains 50 m of hollow profile per one meter of coil in longitudinal direction. The cross-sectional shape and the width of the hollow profile are affected by the overall structure of the collection circuit, the coil radius and the mutual distance between the adjacent coil rounds.

Figure 3:
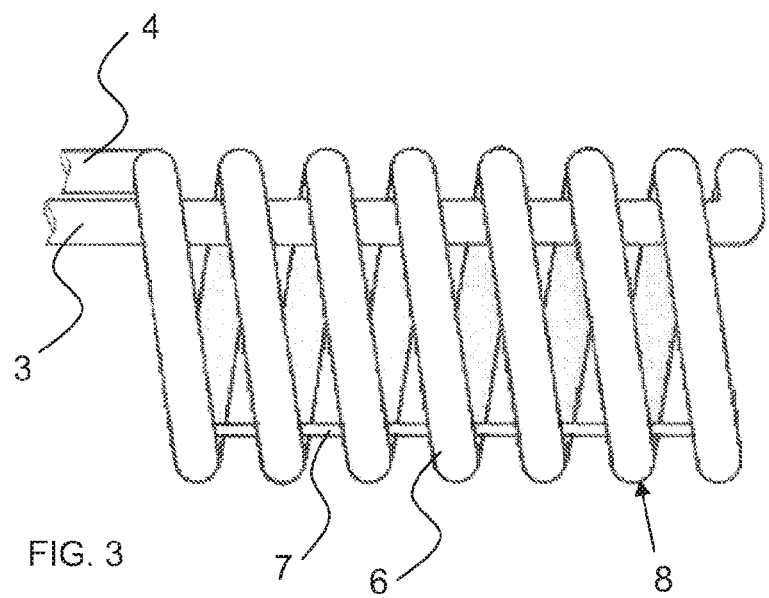
FIG. 3 is a schematic side view of the collection pipe system so as to illustrate its main structural components.

The coil of FIG. 2 is applicable for use in a collection pipe system 2, when a hollow profile 6 is allowed to form a coil that is of an open coil spring type as shown in FIG. 3, in which a connection pipeline 3 joined to the collection pipe system simultaneously forms one of the bracing bars 7 of the coil. The connection pipe is attached, for instance, by mechanical fasteners or by welding most preferably to several loops of the coil so as to prevent the coil from collapsing. The coil may also comprise one or more other bracing bars 7 as shown in the figure.

The collection pipe system 2 of FIG. 3 operates such that the collection pipe system is installed in a water body or to be surrounded by soil, whereby the outer surface 8 of the hollow profile 6 of the collection pipe system comes substantially totally into contact with the surrounding, thermal energy containing material. Thus, the thermal energy is transferred to the transfer fluid circulating in the coil substantially throughout the outer surface of the collection pipe system.

Figure 4:
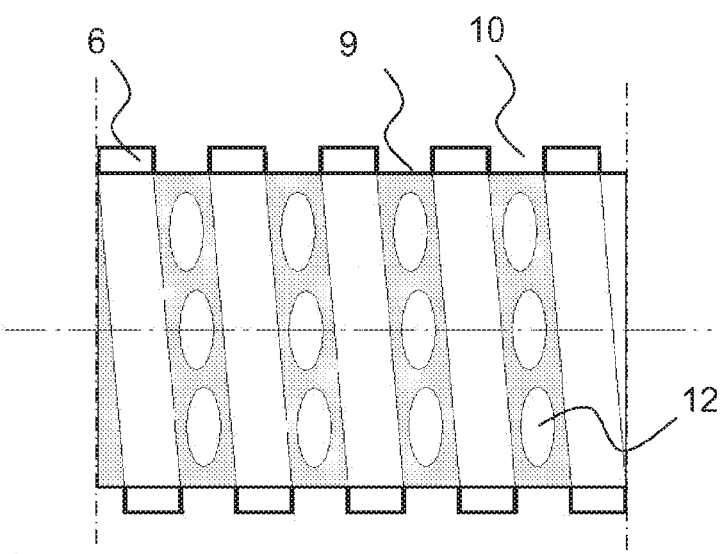
FIG. 4 is a schematic cross-sectional view of a perforated collection pipe system formed by a single hollow profile and a flat bar connected thereto.
Figure 5:
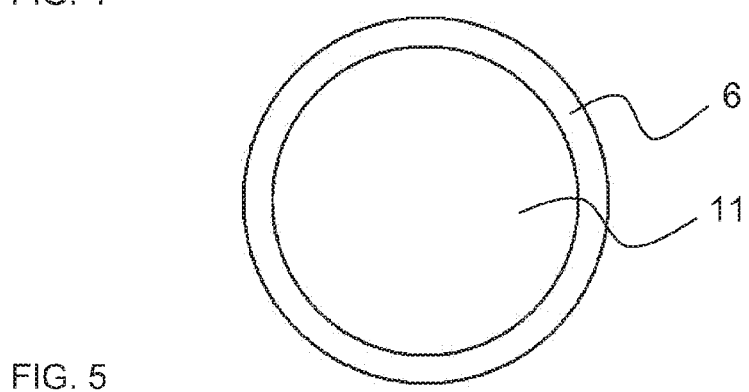
FIG. 5 is an end view of the collection pipe system of FIG. 4.

FIGS. 4 and 5, in turn, show a particular structural solution of an embodiment of the collection pipe system 2 of a ground circuit in the present low-energy system. In that case the collection pipe system consists of a coiled hollow profile 6 known per se, whereby said hollow profile is utilized in the circulation of transfer fluid. In this embodiment the successive rounds of the hollow profile are separated from one another by a flat bar 9 arranged therebetween. In this manner it is possible to obtain a cross section of the collection pipe system as shown in FIG. 4, on the outer surface of which there will be outwardly facing grooves 10 to provide a larger contact surface with the surrounding material. On the other hand, the hollow profile and the flat bar form a tubular structure as shown in FIG. 5, which defines within its limits a cavity in this connection referred to as a flow space 11. The grooves may also be formed such that they are oriented towards this flow space by arranging the flat bar on the opposite edge of the hollow profile of FIG. 4.

By providing the flat bars 9 between the hollow profile 6 with perforations 12 it is possible to convey material into the flow space 11 of the collection pipe system 2 both through the opposite ends of the flow space and through the outer surface of the collection pipe system. This feature may be utilized both when installing the collection pipe system to be surrounded by soil and when installing it to be surrounded by water. For instance, when filling the trench for the collection pipe system with sufficiently fine-grained filling material, the filling material runs more easily also into the flow space, which makes the contact surface larger between the collection pipe system and the material. On the other hand, when the collection pipe system provided with perforated flat bars is installed such that it is surrounded by water, the perforation enables freer flow of water through the structures of the collection pipe system.

The embodiments of the collection pipe system 2 in accordance with FIGS. 6 to 9 preferably consist of a coiled, double-walled pipe known per se. This pipe, in turn, consists of a hollow profile 6 and a cavity, i.e. a flow space 11, provided therein. It is clear that one or more hollow profiles provided side by side may be arranged to encircle the flow space. Into the hollow profile encircling the cavity there is conveyed transfer fluid that is arranged to receive, the hollow profile being in contact with the source material surrounding it and/or locating or moving in the cavity, the thermal energy from this material. The heat transfer fluid transfers this thermal energy through a return pipeline 4 to a heat exchanger 5 connected to the ground circuit so as to recover the thermal energy. In case the flow space of a double-walled pipe is surrounded throughout its length by a plurality of hollow profiles, the heat transfer fluid may be conveyed into one or more of these hollow profiles. Thus, the transfer fluid circulating in the double-walled pipe may be arranged to come into contact with the surrounding source material throughout its surface or just for a portion of its surface. In the former case transfer fluid is conveyed into each parallel hollow profile. In the latter case transfer fluid is conveyed into just one or some hollow profiles.

A variation of this coiled, double-walled pipe is provided, when the successive rounds in the above-mentioned hollow profile are separated from one another by two substantially juxtaposed flat bars such that both the inner surface and the outer surface are uniform.

Figure 6:
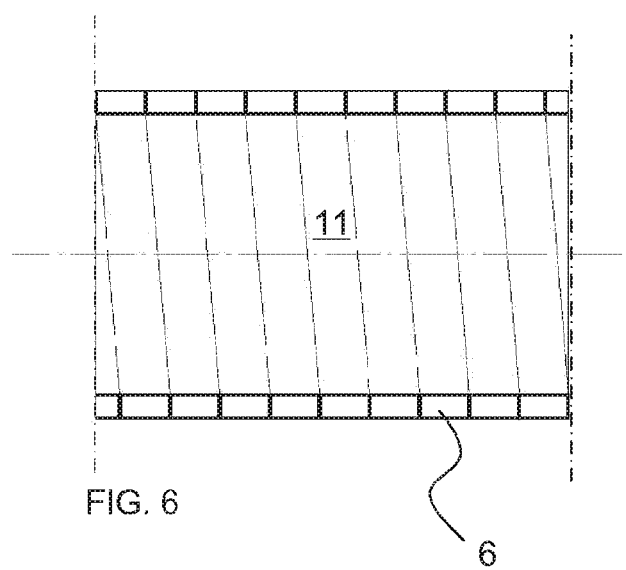
FIG. 6 is a schematic cross-sectional view of the pipe system formed by a single coiled double-walled pipe.
Figure 7:
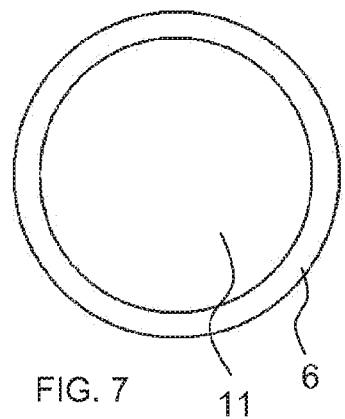
FIG. 7 is an end view of the collection pipe system of FIG. 6.

In accordance with FIGS. 6 and 7, there may be only one double-walled pipe, whereby inside the pipe there is defined one undivided flow space 11 having a relatively large cross section. On the other hand, the collection pipe system 2 may also consist of a plurality of nested, double-walled pipes, in particular for recovering larger amounts of thermal energy, in the manner illustrated in FIGS. 8 and 9. In that case the collection pipe system is formed by at least two, coiled, double-walled pipes mounted substantially concentrically in relation to their longitudinal axis, whereby the collection pipe system will also be provided with several adjacent annular flow spaces—even though the flow space in the middle will be a tubular flow space having a small cross section. The multi-tier collection pipe system of this kind is particularly well suited for use in a water body, and in particular in a water body that flows.

Figure 8:
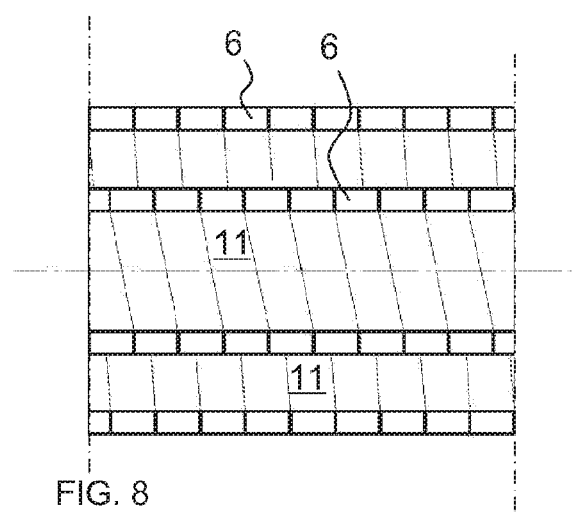
FIG. 8 is a schematic cross-sectional view of the pipe system formed by two, separate, coiled, double-walled pipes.
Figure 9:
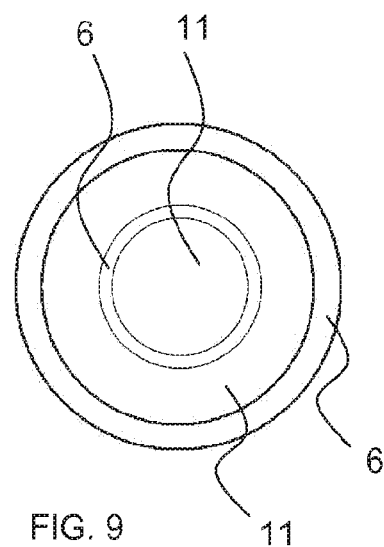
FIG. 9 is an end view of the collection pipe system of FIG. 8.

Even though FIGS. 8 and 9 show a collection pipe system consisting of two nested, double-walled pipes, the number of interfitting pipes may even be higher. However, when the multi-tier collection pipe systems of this kind are formed, it has to be made sure that each adjacent flow space has a cross-sectional area that allows sufficient flow in order to optimize energy exchange between the source material and the heat transfer fluid. In general, the height of the flow space is 50 to 200 mm.

When the collection pipe system 2 is made of a plurality of nested, double-walled pipes as shown in FIGS. 8 and 9, it is advantageous to connect the hollow profiles 6 of each adjacent pipe to connection pipes with a particular inlet manifold 13, through which the cooled transfer fluid may be fed from the connection pipe 3 to the hollow profile. This inlet manifold equalizes the flow of the transfer fluid conveyed into the hollow profile, in particular in the embodiments comprising multiple, nested, hollow profile tiers, in order to enable as steady flow as possible in the collection pipe system. When heated transfer fluid arrives from a first end of the double-walled pipe to its second end, said second end likewise comprises an outlet manifold 14 for conveying the transfer fluid from the hollow profile into the return pipeline 4 and further to the heat exchanger 5. The flow of the transfer fluid in the hollow profiles may be particularly equalized or otherwise controlled by mounting specific valves in the feed and discharge blocks for equalizing the fluid flow. The flow of the transfer fluid is also controllable by selecting the cross-sectional area of the hollow profiles of the nested pipes to be such that they differ slightly from one another, whereby the flows in adjacent and nested pipes are preferably fairly uniform.

The hollow profile 6 of the collection pipe system 2 in accordance with the above embodiments preferably has a cross section that is substantially square-shaped. However, the shape of the profile is not restricted to this shape, but also other known cross-sectional shapes are possible, as long as they are suitable for the manufacture of helical collection pipe system. Even though particularly the above-mentioned double-walled pipes are mainly manufactured of square-shaped plastic profile, also other materials, such as aluminium and steel, are well suited for the manufacture of collection pipe systems described herein.

The present collection pipe system 2 of a ground circuit in a low-energy system may be installed in a variety of ways to be surrounded by source material. So, the collection pipe system may be placed substantially horizontally in water, where water flows continuously therethrough, or in substantially vertical position in non-flowing water, whereby natural vertical flow resulting from the cooling of water will be provided in the flow space 11 of the collection pipe system.

The collection pipe system may also be installed upright in a so-called heat well, where it is surrounded by source material. The collection pipe system may be further installed horizontally in a trenchlike dugout, where it is advantageously surrounded by fine-grained source material. It is particularly advantageous to use the collection pipe system in a groundwater basin, where water enhances heat exchange from the surrounding material into the heat transfer fluid circulating in the hollow profile 6.

By installing the collection pipe system 2 of the ground circuit in flowing water, the water flushes both sides of the hollow profiles containing the heat transfer fluid thus enhancing significantly the transfer of thermal energy into the transfer fluid and thus further to a heat exchanger 5 or a cooling apparatus.

Figure 14:
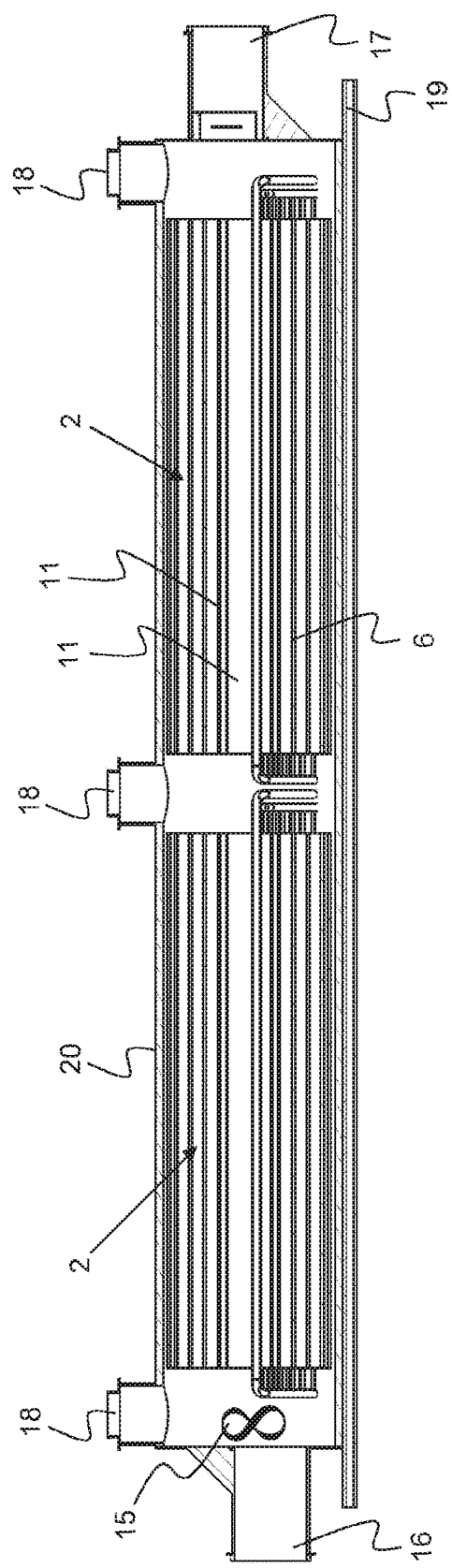
FIG. 14 is a cross-sectional view of an arrangement, in which nested coils of collection pipe system collect thermal energy from a water body, for instance a lake.
Figure 15:
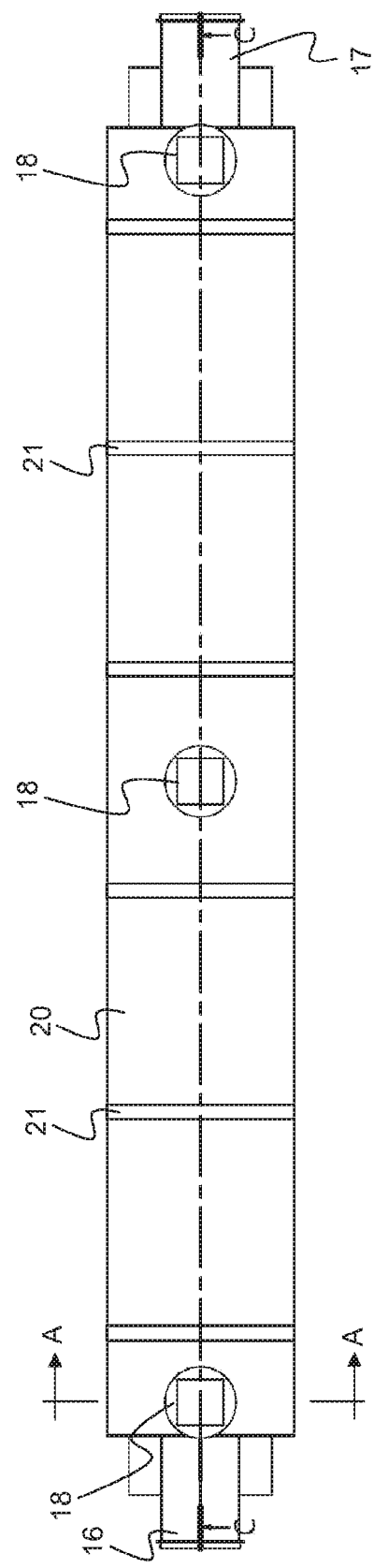
FIG. 15 is a top view of the arrangement of FIG. 14.
Figure 16:
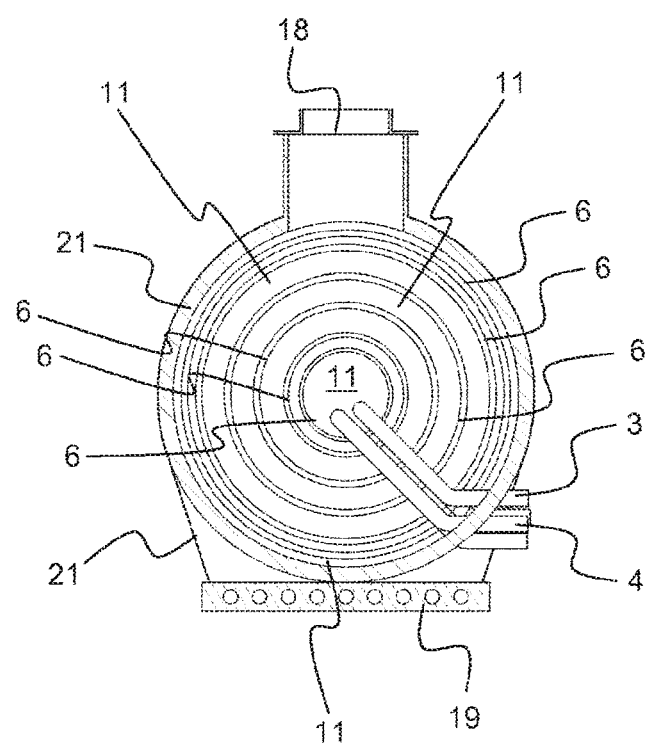
FIG. 16 is a cross-sectional view in accordance with FIG. 14 at point A-A in FIG. 15.

Particularly high efficiency of energy transfer is achieved, when the collection pipe system 2 forms a collector arrangement shown in FIGS. 14 to 16 and comprising nested, coiled pipes of different cross-sections, their number being two to twelve, preferably seven to nine. For reasons of drawing technique, these figures only show six nested pipes and the flow space 11 surrounded thereby. The pipes may be either double-walled or they may consist of coil loops separated by a flat bar, whereby the flat bar is advantageously perforated to provide improved flow-through.

As described above, in these coiled, hollow profiles there flows a transfer fluid that recovers thermal energy from a water body by conveying the water into the flow spaces 11 between the pipe tiers preferably by means of a propeller pump 15.

The manufacturing material of the collector arrangement is preferably plastic, for instance HD-PE plastic, whereby all joints are produced by a welding method required by each particular application. The advantages of plastic material include very long service life and a structure that is durable, strong and impermeable in use.

For conveying water into the collector system it is to be equipped with an inlet pipe 16 and a discharge pipe 17. These are to be equipped with protective strainers so that no foreign objects have access to the collector arrangement or the flow-providing propeller pump to damage them or to hamper the flow. For safety reasons and for reliable operation, manholes arranged in service wells 18 appearing in FIGS. 14 to 16 are lockable, naturally. The extremely simple structure of the collector arrangement guarantees reliable operation over a long time span.

By attaching the collection pipe system of this collector arrangement to a particular, purpose-built anchoring slab 19 appearing in FIG. 14, for instance it is possible to provide a ready-to-install collection pipe system element. In the figure the attachment is implemented with attachment ties 21 wound around the jacket of the outermost protective pipe 20.

This collector arrangement is simple and fast to install anywhere in flowing water or in the vicinity thereof. The connection and return pipelines 3 and 4 belonging to the collector arrangement are connectable by simple measures to a separate heat exchanger.

By selecting the total length of collector arrangement to be about 15 m in the embodiment as shown in FIGS. 14 to 16 there is provided a collection pipe system, in which the total surface area of the hollow profile 6 is up to 1,000 m$^2$. It is advantageous to group the collection pipe system of the collector arrangement into two cellular series, as shown in the figures. It is found that by dividing the collector pipe system into two parts in this manner, it is possible to enhance the collection of thermal energy from the source material.

Computationally, the efficiency of the collector arrangement of this type is found to be in the order of 700 kW, when water at the temperature of +4° C. is circulated therein. This means that the output heating capacity in accordance with the embodiment of this collector arrangement would be 1 MW, when utilized with a coefficient of performance 3 (COP-3). By way of comparison, this heating capacity would be sufficient for about 100 standard-sized detached houses. The collector arrangement itself would require about 10 kW of power, which is needed by the propeller pump for the flow motion of water.

When comparing this collector arrangement with conventional rock or sediment heat solutions considerable advantages are achieved. For instance, it may be stated that one collector arrangement in accordance with FIGS. 14 to 16 corresponds to a good 70 rock heat wells that are 300 m deep, when the collector arrangement is subjected to continuous energy supply. Because the present collector arrangement is remarkably efficient, the cost of the ground circuit will be lower than before. When the present collector arrangement is utilized, the purchase and installation costs of the ground circuit are just one third of those of the previous solutions. The construction area required by the ground circuit is also significantly smaller when the above collector arrangement is compared with a bore well field.

When the collector arrangement is made of plastic, a structure is provided that tolerates as well salinity as variations in temperature of ambient material better than before. Thus, the collector arrangement also has a longer service life than before.

Figure 10:
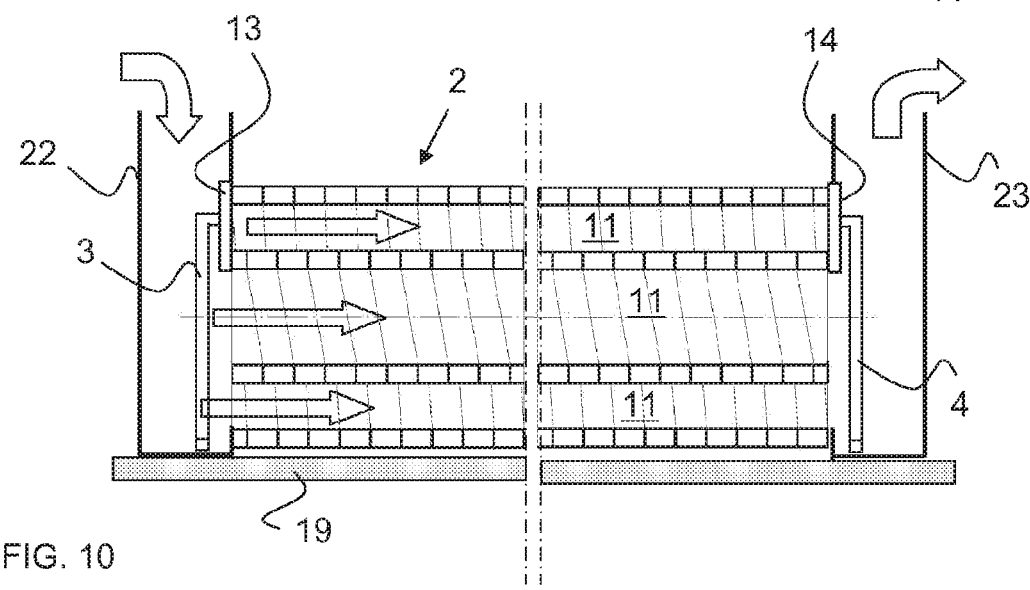
FIG. 10 shows a collection pipe system provided with head and end wells, in which pipe system nested hollow profiles are interconnected with a fitting.

The collector arrangement consisting of one or more coiled, multi-tier collection pipe system elements may also comprise at its first end a substantially vertical head pipe 22 as shown in FIG. 10. The main purpose of this head pipe is to protect the water-flow-encountering first ends of pipes, which form the collection pipe system 2 installed in a water body, from persistent erosion resulting from impurities in the water and from impacts caused by objects passing along the water. The head pipe 22 also conveys the water flow at a steady pressure into at least one flow space 11 of the collection pipe system.

The water flow pressure prevailing in the collection pipe system 2 may be further equalized by arranging at the second end of the coiled pipes, opposite to the head pipe 22, a substantially vertical end well 23 as illustrated in FIG. 10. The water discharged from the flow space 11 enters thus the end well, wherefrom it returns to a surrounding flow after a vertical transfer.

When the above-described collection pipe system elements are manufactures, the connection and return pipes 3 and 4 may be mounted safely on the anchoring slab 19 and be protected by the head pipe 22 and the end well 23 as shown schematically in FIG. 10.

The solution provided by the present collection pipe system is particularly advantageous to install in condensing water flow of power plants or the like, in discharge flows of waste water treatment plants and in rivers or in other natural water flows, such as tidal areas.

If considered that the use of the head pipe 22 is not necessary, it is possible to protect the multi-tier collection pipe element by a protective frame to be mounted at both ends. For instance, a protective metal frame prevents foreign objects, such as logs, ice blocks and the like, from damaging the collection pipe system element.

The described collection pipe system element may also be utilized by installing it on dry land, close to a water body, such as described in FIG. 14. Thus, the head pipe 22 and the end well 23 may form vertical wells at the opposite ends of the collection pipe system element, when so desired. Through these vertical wells it is possible to convey water of the nearby river or other water body, for instance, with inlet and outlet pipes 16 and 17 into and out of the collection pipe system 2. When necessary, the flow rate of water may be controlled in the collection pipe system by a pump 15 to be mounted on the head pipe or the collection pipe system in the above-described manner. In addition, these vertical wells may be utilized for maintenance of the collection pipe system element, for instance, for washing it with pressure washers.

The ground circuit in a low-energy system as described here is utilized in the following manner. The collection pipe system 2 comprised by the ground circuit is arranged in the above-described manner to form at least one coil, each coil having a substantially uniform cross section. The transfer fluid in the ground circuit is passed along this coil, as shown in FIG. 3, from a connection pipeline 3 at its first end to its second end and the second end of the coil is connected to a return pipeline 4 for conveying the transfer fluid flow further to be used, for instance, in a heat pump 5 of FIG. 1.

The outer surface 8 of the collection pipe system 2 is arranged to come into contact with surrounding source material containing thermal energy such that the thermal energy is transferred to the transfer fluid circulating in the coil substantially throughout the outer surface of the collection pipe system. By arranging the collection pipe system to comprise several coils so that the coils are nested substantially concentrically, for instance, in the manner shown in FIGS. 8 and 9, and by interconnecting them into a continuous collection circuit through connection and return pipelines 3 and 4, it is possible to multiply the amount of recovered thermal energy per one meter of collection pipe system in longitudinal direction.

When the collection pipe system 2 is formed by at least one coiled pipe consisting of a hollow profile 6 and a cavity surrounded thereby, i.e. a flow space 11, both the outer surface of the pipe provided by the hollow profile and the inner side thereof may be arranged to be simultaneously in contact with the surrounding source material containing thermal energy. When a double-walled pipe is used, the thermal energy is transferred to the transfer fluid circulating in the hollow profile both throughout the outer surface of the pipe and throughout the inner surface of the pipe. When the collection pipe system comprises a plurality of coils, the nested pipes form between them separate flow spaces, and the innermost pipe cavity forms a flow space, which flow spaces extend throughout the length of the collection pipe system. In this manner both the outer surface and the inner surface formed in each pipe by the hollow profile are arranged to be in contact with the surrounding source material containing thermal energy by conveying a fluid flow through the flow spaces of the collection pipe system.

Figure 11:
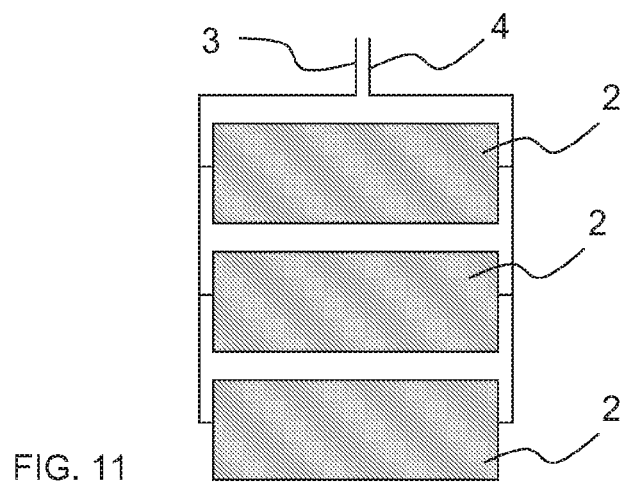
FIG. 11 shows a collection field formed by collection pipe systems arranged in juxtaposition.
Figure 12:
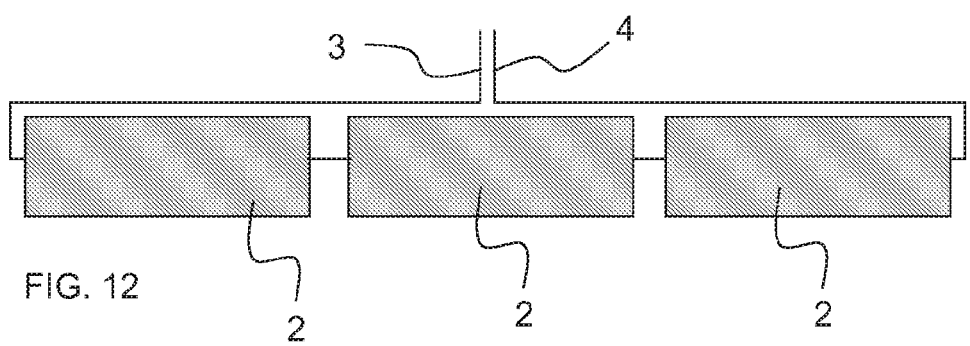
FIG. 12 shows a collection field formed by pipe systems arranged in series.
Figure 13:
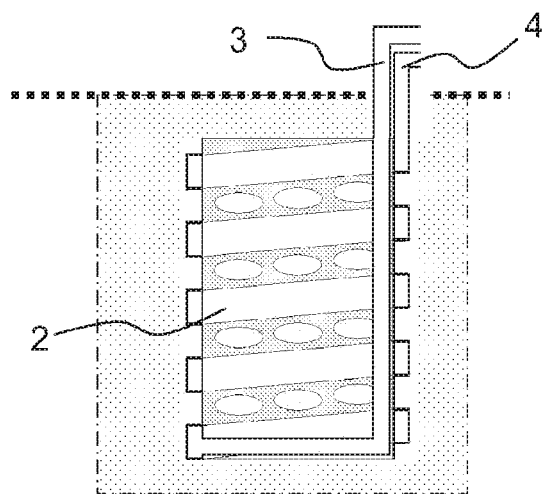
FIG. 13 shows a collection pipe system surrounded by soil and arranged in a substantially vertical position.

Recovery of thermal energy may also be enhanced by arranging the ground circuit to comprise at least two collection pipe systems 2 in juxtaposition, as shown in FIG. 11. Alternatively, or additionally, the collection pipe system may comprise at least two successive collection pipe systems, as shown in FIG. 12.

It is obvious to a person skilled in the art that as technology advances the basic idea of the above-described solution may be implemented in a variety of ways. The described solution and the embodiments thereof are not restricted to the above examples, but they may vary within the scope of the claims.

The invention claimed is:

1. A method for recovering energy in a ground circuit in a low-energy system, the ground circuit comprising a connection pipe (3), collection pipe system (2) and a return pipeline (4) for circulating a transfer fluid and for recovering energy, a flow of the transfer fluid being provided in the ground circuit for transferring the energy to a place where it is used, the method comprising the steps of:

forming the collection pipe system (2) from a hollow profile (6) by coiling the hollow profile into at least one coil, the coil forming a coiled double-walled pipe having a substantially uniform cross section and the hollow profile (6) surrounding at least one flow space (11) formed in the collection pipe system by individual coils of the double-walled pipe touching;

conveying the transfer fluid along the hollow profile from the connection pipe (3) from a first end of the coiled pipe to a second end of the coiled pipe, a second end of the hollow profile being connected to the return pipeline (4) in order to control the flow of the transfer fluid further to a place where it is used;

arranging an outer surface of the collection pipe system (2) to be in contact with a surrounding source material containing thermal energy such that the thermal energy is transferred to the transfer fluid circulating in the coiled double-walled pipe substantially throughout the outer surface of the collection pipe system;

forming at least one additional coiled pipe of a different cross section than the coiled double-walled pipe;

arranging the coiled pipes in a nested and substantially concentric manner such that the coiled pipes form between them separate flow spaces (11), the innermost pipe cavity forming a flow space, the flow spaces extending throughout a length of the collection pipe system;

arranging both an outer surface and an inner surface of each hollow profile (6) of each coiled pipe to be in contact with the surrounding, energy-containing source material by conveying the flow of the energy-containing source material through the flow spaces (11) of the collection pipe system (2), and distributing the flow of the transfer fluid into the flow spaces (11) by conveying the transfer fluid into a head pipe (22) interconnecting the flow spaces.

2. The method for recovering energy in accordance with claim 1, wherein a pressure of the transfer fluid flow in the flow spaces (11) is stabilized by conveying the transfer fluid after the flow spaces to a common end well (23) connected thereto.

3. The method for recovering energy in accordance with claim 1, wherein the ground circuit is formed to comprise at least two collection pipe systems (2) arranged in juxtaposition.

4. The method for recovering energy in accordance with claim 1, wherein the ground circuit is formed to comprise at least two collection pipe systems (2) arranged successively.

5. The method for recovering energy in accordance with claim 1, wherein the at least one additional coiled pipe forms an additional coiled double-walled pipe.

* * * * *